US008977933B2

(12) United States Patent
Cloetens (10) Patent No.: US 8,977,933 B2
(45) Date of Patent: Mar. 10, 2015

(54) METHOD FOR PROVIDING DATA PROTECTION FOR DATA STORED WITHIN A MEMORY ELEMENT AND INTEGRATED CIRCUIT DEVICE THEREFOR

(75) Inventor: Henri Cloetens, Kapelle Op Den Bos (BE)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/634,760

(22) PCT Filed: Jun. 11, 2010

(86) PCT No.: PCT/IB2010/052617
§ 371 (c)(1),
(2), (4) Date: Sep. 13, 2012

(87) PCT Pub. No.: WO2011/154780
PCT Pub. Date: Dec. 15, 2011

(65) Prior Publication Data
US 2013/0080859 A1 Mar. 28, 2013

(51) Int. Cl.
*G11C 29/00* (2006.01)
*G06F 11/10* (2006.01)
*G06F 21/64* (2013.01)
*G06F 21/79* (2013.01)

(52) U.S. Cl.
CPC ............ *G06F 11/1028* (2013.01); *G06F 21/64* (2013.01); *G06F 21/79* (2013.01)
USPC .......................................... 714/773; 714/776

(58) Field of Classification Search
USPC ................................................. 714/773, 776
See application file for complete search history.

(56) References Cited

U.S. PATENT DOCUMENTS

| 8,458,572 | B1 * | 6/2013 | Vlaiko .......................... 714/776 |
|---|---|---|---|
| 2002/0029364 | A1 | 3/2002 | Edmonston et al. |
| 2002/0188905 | A1 | 12/2002 | Hollums |
| 2003/0196157 | A1 | 10/2003 | Kern et al. |
| 2006/0101193 | A1 | 5/2006 | Murin |
| 2007/0038902 | A1 | 2/2007 | Kawahara et al. |
| 2009/0177943 | A1 | 7/2009 | Silvus et al. |
| 2009/0204877 | A1 | 8/2009 | Betts |
| 2010/0023711 | A1 | 1/2010 | Thyagarajan |

FOREIGN PATENT DOCUMENTS

WO 2009053962 A3 4/2009

OTHER PUBLICATIONS

Argyrides Costas et al: "Matrix Codes: Multiple Bit Upsets Tolerant Method for SRAM Memories", 22nd IEEE International Symposium on Defect and Fault Tolerance in VLSI Systems, 2007 IEEE, pp. 340-348.
International Search Report and Written Opinion correlating to PCT/IB2010/052617 dated Apr. 1, 2011.

* cited by examiner

*Primary Examiner* — Sam Rizk (57) ABSTRACT

A method for providing data protection for data stored within a Random Access Memory element. The method comprises receiving data to be written to memory, dividing the received data into a plurality of data sections, applying error correction codes to the data sections to form codeword sections, interleaving the codeword sections to form an interleaved data codeword, and writing within a single clock cycle the interleaved data codeword to memory.

20 Claims, 4 Drawing Sheets

METHOD FOR PROVIDING DATA PROTECTION FOR DATA STORED WITHIN A MEMORY ELEMENT AND INTEGRATED CIRCUIT DEVICE THEREFOR

FIELD OF THE INVENTION

This invention relates to a method for providing data protection for data stored within a memory element and an integrated circuit device therefor.

BACKGROUND OF THE INVENTION

In the field of integrated circuit devices, and in particular in the field of integrated circuit devices for use in automotive applications, it is known to use error-correction codes (ECCs) to protect data stored within RAM (Random Access Memory), particularly to protect against "soft errors" within the data caused by error events such as, for example, alpha radiation, atmospheric neutrons, etc. Examples of such error-correction codes are extended Hamming codes, Hsia codes and similar linear codes, which provide single-bit error correction and double bit error detection.

Figure 1:
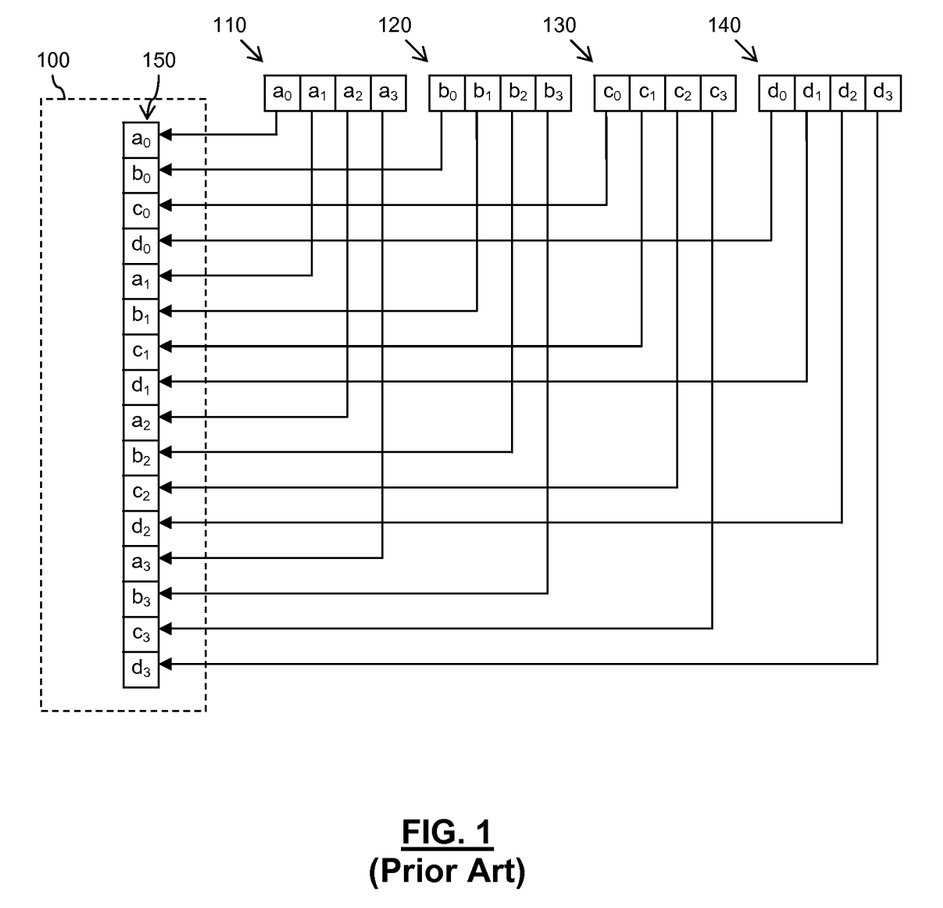
FIGS. 1 and 2 illustrate an example of RAM memory.
Figure 2:
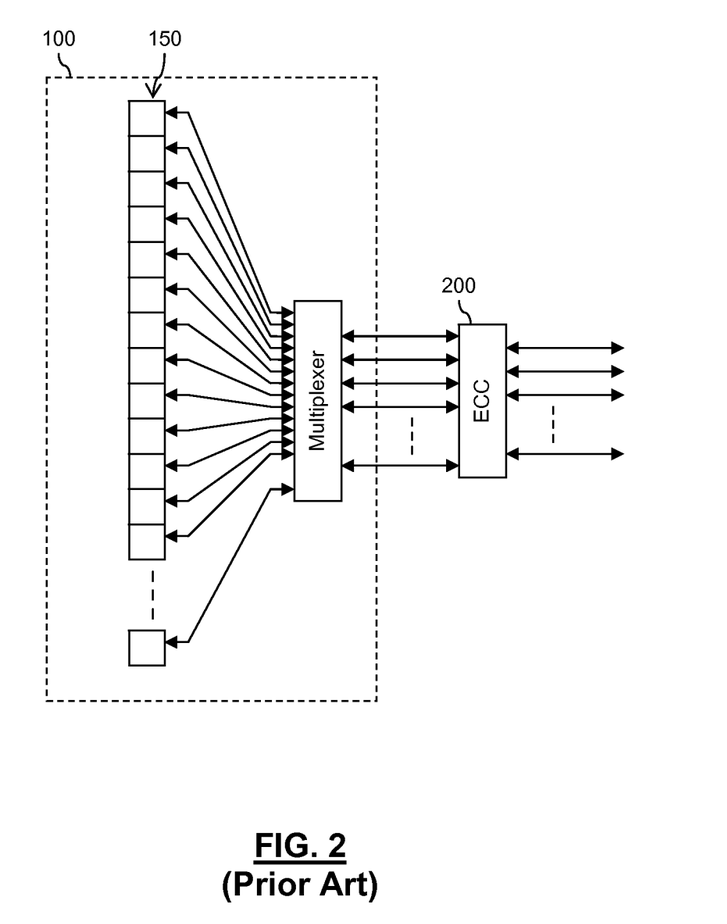

As process technologies have evolved and been scaled down to nanometers, a single error event (e.g. caused by a single alpha or neutron particle) can cause multiple neighbouring bit cells within RAM to change state, and therefore become corrupted. Thus, the single-bit error correction provided by traditional ECC techniques alone is insufficient to protect against such error events. To overcome this problem, it is known to interleave data words stored within a block of RAM. In this manner, neighbouring data bits of a data word are not stored adjacent to one another within the block of RAM. This technique is typically denoted as a multiplexing (MUX) factor. For example, FIG. 1 illustrates a simplified block diagram of RAM 100 with a MUX factor '4'. Accordingly, four data words 110, 120, 130, 140 (each comprising four bits for the simplified illustrated example) are interleaved into a single row 150 of bit cells of the block of RAM 100. In this manner, for a block of RAM with a MUX factor '4', such as the block of RAM 100 illustrated in FIG. 1, every fourth data bit stored within a row of bit cells belongs to the same data word. If an error event occurs, for example by way of an alpha particle or neutron hitting the block of RAM, such that up to four adjacent bit cells within a single row become corrupted, only one bit in any data word will be corrupted. Thus, in this manner, the error is capable of being corrected by traditional ECC single-bit error correction techniques. Furthermore, and as illustrated in FIG. 2, by passing data read from a block of RAM 100 with a MUX factor 4 through a traditional ECC functional block 200, multi-bit error events that corrupt up to four adjacent bit cells within a single row 150 may be protected against.

However, with the continued shrinking of process technology and feature size, RAM bit cells are becoming ever smaller, with the number of adjacent RAM bit cells that may be affected by a single error event becoming greater. Accordingly, there is a demand for data stored within a block of RAM to be protected against multi-bit error events that corrupt greater numbers of adjacent bit cells within a single row of RAM bit cells.

One solution to this problem is to use an ECC code that is able to correct, say, two errors, instead of the single-error codes. In this manner, when used in conjunction with a RAM having a MUX factor of '4', multi-bit error events that corrupt up to eight adjacent bit cells within a single row may be protected against. However, a problem with this approach is that the use of such multi-error correction codes is much slower than the single-error codes, making such multi-error correction codes impractical from the point of view of performance.

Another solution to this problem is to increase the MUX factor for the block of RAM, for example to use a block of RAM with a MUX factor of '8', whereby data bits of eight data words are interleaved into a single row of RAM bit cells. In this manner, every eighth data bit within a row belongs to the same data word. When implemented with traditional ECC single-bit error correction techniques, multi-bit error events that corrupt up to eight adjacent bit cells within a single row may be protected against.

A problem with this solution is that it places significant constraints on the physical implementation of the block of RAM. Whilst such constraints may be accommodated with large blocks of RAM, for smaller blocks of RAM such constraints make this solution impractical. For example, suppose a block of RAM is required to comprise 32-bit words and, say, 256 words. If this block of RAM is implemented with a MUX factor of 4, the block of RAM will comprise a matrix of RAM bit cells comprising (32*4=128) rows (bit-lines), and (256/4=64) columns. Thus, the matrix of RAM bit cells comprises a factor 2 difference between dimensions. However, if the block of RAM is implemented with a MUX factor of 8, the number of rows required becomes 32*8=256, and the number of columns becomes (256/8=32). Consequently, the matrix of RAM bit cells comprises a factor 8 difference; 256 rows×32 cols. As a result, this RAM array will comprise a thin rectangle on the silicon, resulting in poor area efficiency and poor timing. Typically, a figure-of-merit for the dimension of the matrix of RAM bit cells may be considered as: (#bit*MUX_FACTOR) should not differ more than a factor of between 2 and 4 of the (#words/MUX_FACTOR).

SUMMARY OF THE INVENTION

The present invention provides a method for providing data protection for data stored within a memory element and integrated circuit device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In summary, example embodiments relate to a method and integrated circuit for providing data protection for data stored within a Random Access Memory (RAM) element. According to some example embodiments, the method comprises receiving data to be written to memory and dividing the received data into a plurality of data sections. Error correction codes may then be applied to the data sections to form codeword sections, for example each codeword section may comprise one of the data sections and error correction code bits appended thereto. The codeword sections may then be interleaved with one another to form an interleaved data codeword, which may then be written to memory within a single clock cycle. According to some further example embodiments, a method may comprise reading a data codeword from memory within a single clock cycle and de-interleaving the read data codeword to obtain a plurality of codeword sections. Error detection and correction may then be performed on the de-interleaved data codeword sections to retrieve data sections, which may then be combined to reproduce user data.

In this manner, by dividing data to be written to memory into a plurality of sections, and applying error correction codes to the individual data sections, the ability to detect and correct errors within the data is increased, as compared to performing the same (or analogous) error correction technique to the data as a whole. For example, using traditional ECC single-bit error correction techniques on the data as a whole only enables one single-bit error to be corrected within the data as a whole. However, by dividing the data into a plurality of data sections and applying such ECC single-bit error correction techniques to each section individually, a single-bit error is able to be detected within each data section. Thus, for example, if the data is divided into, say, two data sections, two single-bit errors may be detected within the data (one per data section), as opposed to just one single-bit error when traditional ECC single-bit error correction techniques are applied to the data as a whole.

Furthermore, by interleaving the codeword sections to form an interleaved data codeword that is then written to memory, consecutive bits of each codeword section are located at one in every n consecutive bits of the interleaved data codeword, where n is the number of codeword sections being interleaved. In this manner, if less than or equal to n consecutive bits within the interleaved data codeword stored in memory become corrupted, for example as a result of a single error event (e.g. caused by a single alpha or neutron particle), only a single bit relating to any one codeword section will have been corrupted. Accordingly, when the interleaved data codeword is subsequently read from memory and the codeword sections are de-interleaved, traditional ECC single-bit error correction techniques may be used to correct the single error in each codeword section to retrieve the original data sections, which may then be re-combined to obtain the original user data. Thus, in this manner, the data stored in memory may be protected from a single error event (e.g. caused by a single alpha or neutron particle) that causes up to n consecutive bits within the interleaved data codeword stored in memory to become corrupted using traditional ECC single-bit error correction techniques.

Figure 3:
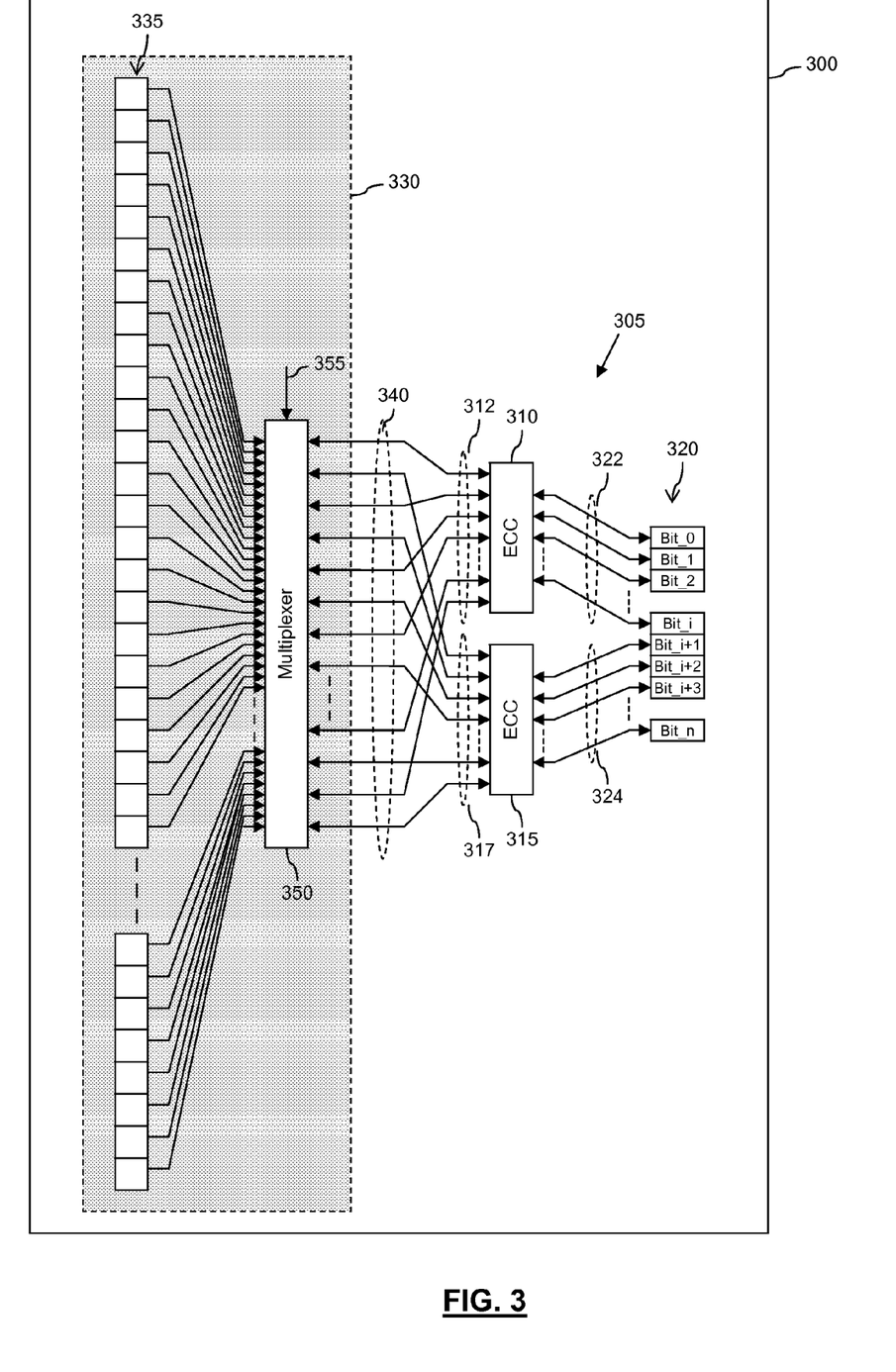
FIG. 3 illustrates a simplified block diagram of an example of an integrated circuit device.

Referring now to FIG. 3, there is illustrated a simplified block diagram of an example of an integrated circuit device 300 adapted in accordance with some example embodiments of the present invention. The integrated circuit device 300 comprises a memory access module 305 for reading and writing data from/to memory. For the illustrated example, the memory access module 305 is arranged to read and write data from/to a memory element 330, which for the illustrated example forms an integral part of the integrated circuit device 300.

In accordance with one example, the memory access module 305 is arranged to receive data 320 to be written to memory and to divide the received data into a plurality of data sections, which for the illustrated example comprise sections of consecutive data bits illustrated generally at 322 and 324. The memory access module 305 is then arranged to apply error correction codes to the data sections to form codeword sections. Accordingly, for the illustrated example the memory access module 305 comprises a plurality of error correction code (ECC) blocks 310, 315, where each ECC block 310, 315 is arranged to receive one data section 322, 324 of received data 320. Upon receipt of a data section 322, 324 of received data 320, each ECC block 310, 315 generates an error correction code for its respective data section 322, 324, and appends the error correction code to the respective data section 322, 324 to form a codeword section, which is output as illustrated at 312, 317. The memory access module 305 is further arranged to interleave the codeword sections 312, 317 output by the ECC blocks 310, 320 to form an interleaved data codeword, as illustrated generally at 340. This interleaved data codeword is then written to the memory element 330 within a single clock cycle.

In accordance with some example embodiments, the memory access module 305, or more specifically for the illustrated example the EEC blocks 310, 315, is (are) arranged to apply single-bit error correction codes to the data sections 322, 324 to form the codeword sections 312, 317. In this manner, the delay caused by the application of such error codes is minimal. Such single-bit error correction code techniques are well known, and accordingly shall not be described herein in greater detail.

For the illustrated example, the memory access module 305 is arranged to divide the received data into two data sections 322, 324. However, in other examples, the concept is not limited to dividing the received data 320 into just two data sections 322, 324, and thus the received data 320 may be divided into any suitable number (n) of data sections, and to apply error correction codes to those n data sections to form n codeword sections, and to interleave the n codeword sections to form a single interleaved data codeword. In this manner, by interleaving the codeword sections 312, 317 to form an interleaved data codeword 340 that is then written to memory 330 in a single clock cycle, consecutive bits of each individual codeword section 312, 317 are located at one in every n consecutive bits of the interleaved data codeword 340. Thus, if less than or equal to n consecutive bits within the interleaved data codeword stored in memory become corrupted, for example as a result of a single error event (e.g. caused by a single alpha or neutron particle), only a single bit relating to any one codeword section 312, 317 will have been corrupted. Accordingly, when the interleaved data codeword 340 is subsequently read from memory 330 and the codeword sections 312, 317 are de-interleaved, traditional ECC single-bit error correction techniques may be used to correct the single error in each codeword section 312, 317 to retrieve the original data sections 322, 324, which may then be re-combined to obtain the original user data 320. Thus, in this manner, the data stored in memory 330 may be protected from a single error event (e.g. caused by a single alpha or neutron particle) that causes up to n consecutive bits within the interleaved data codeword 340 stored in memory 330 to become corrupted using traditional ECC single-bit error correction techniques.

In accordance with some example embodiments, the memory access module 305 may further be arranged to write consecutive bits of the interleaved data codeword 340 to, say, one in every i consecutive bit cells in a row of memory bit cells 335 within the memory element 330. For example, the memory access module 305 may comprise a multiplexing module 350. arranged to receive an interleaved data codeword 340 and to write the first bit of the received interleaved data codeword 340 to one of i starting bit cells (according to a control signal 355) in a row of memory bit cells 335. The memory access module 305 may also write the subsequent consecutive bits of the received interleaved data codeword 340 to every $i^{th}$ consecutive bit cell in the row of memory bit cells 335 within the memory element 330. In this manner, the multiplexer module 350 may be arranged to write i interleaved data codewords 340 to a single row of memory bit cells 335 such that the i interleaved data codewords are themselves interleaved with one another when stored in the memory element 330.

Such multiplexing of data words stored within a row of memory is known with respect to a block of, say, RAM (Random Access Memory) comprising a MUX factor of "i". Accordingly, for the illustrated example, the memory element 330 may comprise a block of RAM comprising a MUX factor of, say, '4', and the multiplexer module 350 forms a part of the memory element 330 and is arranged to multiplex four interleaved data codewords 340 within a row of memory bit cells 335. Thus, as for the illustrated example, the memory access module 305 may comprise components both integral with, and external to, the memory element 330 to which the memory access module 305 is arranged to provide access.

The multiplexing of data words stored within a row of memory in this manner results in neighbouring data bits of a data word not being stored adjacent to one another within a row of memory. For example, where i data words are multiplexed into a single row of memory, every $i^{th}$ data bit stored within the row belongs to the same data word. If an error event occurs, for example by way of an alpha particle or neutron hitting the block of memory, such that up to i adjacent bit cells within a single row become corrupted, only one bit in any data word will be corrupted. Thus, and in accordance with some example embodiments, by implementing such multiplexing in conjunction with interleaved data codewords 340 formed by the memory access module 305 as described above, even if i*n adjacent bit cells within a single row become corrupted, the original user data may still be recovered using traditional ECC single-bit error correction techniques.

For example, taking a case where the number (n) of data sections 322, 324 into which user data 320 is divided by the memory access module 305, and the number of codeword sections 312, 317 output by the ECC blocks 310, comprises, say, two, and the number (i) of interleaved data codewords 340 that are multiplexed into a row of memory bit cells 335 is equal to four. If i*n adjacent bits, which for this example comprises eight adjacent bits, within a single row of memory bits 335 become corrupted, for example due to an alpha particle or neutron hitting the block of memory, since every $i^{th}$ bit belongs to the same interleaved data codeword 340, n consecutive bits within each interleaved data codeword 340 will have become corrupted. Thus, for this example only two consecutive bits within each interleaved data codeword 340 will have become corrupted.

As previously mentioned, by interleaving the codeword sections 312, 317 to form an interleaved data codeword 340 that is then written to memory 330, consecutive bits of each codeword section 312, 317 are located at one in every n consecutive bits of the interleaved data codeword 340. Thus, for this example, consecutive bits of each codeword section 312, 317 are located at one in every two consecutive bits of the interleaved data codeword 340. Thus, when two consecutive bits within each interleaved data codeword 340 have become corrupted, as is the case for the above example, the two corrupted bits correspond to two different codeword sections 312, 317. Accordingly, when the interleaved data codeword 340 is subsequently read from memory and the codeword sections 312, 317 are de-interleaved, each codeword section 312, 317 will comprise only a single corrupted bit. Thus, traditional ECC single-bit error correction techniques may then be used to correct the single error in each codeword section 312, 317 to retrieve the original data sections 322, 324, which may then be re-combined to obtain the original user data 320. Thus, in this manner, the data stored in memory may be protected against up to i*n consecutive bits, which for the above example comprises up to eight consecutive bits, within a row of memory bit cells 335 within the memory element 330 from becoming corrupted, for example as a result of a single error event (e.g. caused by a single alpha or neutron particle), using traditional ECC single-bit error correction techniques.

To aid understanding, a detailed example of an implementation of the present invention is provided as follows. Let us assume a need exists for a 256-entry deep block of RAM with a user word width of 32 bits, and there is a requirement for errors affecting up to eight adjacent RAM bit cells to be protected against. In order to avoid the use of slow multi-error correction codes, a known prior art technique may comprise the use of a block of RAM comprising a MUX factor of '8' to provide the required data protection. The block of RAM would require a width of 39 bits (32 bits for user data and 7 bits for ECC checksums).

Conversely, for an example of an implementation of the present invention, a block of RAM comprising a MUX factor of '4' is sufficient to provide the required data protection when used in conjunction with, say, a memory access controller that divides the user data into two data sections, and then interleaves ECC protected codeword sections derived from those two data sections to generate an interleaved codeword to be stored in memory. For example, the memory access controller 305, in the example illustrated in FIG. 3, may be arranged to receive data to be written to memory comprising a 32 bit word, divide the received data into two 16 bit data sections, apply a 6 bit error correction code to each data section to form two 22 bit codeword sections, and to interleave the two 22 bit codeword sections to form a 44 bit interleaved data codeword. The 44 bit interleaved data codeword may then be provided to the block of RAM 330 comprising the MUX factor of 4 and written to every fourth bit cell in a row 335 of memory 330. In this example, the block of RAM would require a width of 44 bits (32 bits for user data and 12 bits for ECC checksums—or more precisely 2*16 for user data and 2*6 for ECC checksums).

Significantly, a need to use blocks of RAM with higher MUX factors is substantially alleviated in order to achieve the higher level of protection, without the need to resort to the use of slower multi-error correction codes. Whilst a wider block of RAM is required for implementing the above example of the invention, for smaller blocks of RAM comprising dimensions whereby, for example, (#bit*MUX_FACTOR) differs by no more than a factor of between 2 and 4 from (#words/MUX_FACTOR), improved area efficiency and timing may be achieved that compensate for the wider RAM block.

Thus, the illustrated example of a memory access module 305 enables multi-bit error events that corrupt larger numbers of adjacent bit cells within a single row of memory to be protected against when compared to known prior art techniques without the need to use slower multi-error correction codes, and without the need to use, for example, blocks of RAM having an increase MUX factors.

For the example illustrated in FIG. 3, the memory access module 305 comprises two separate ECC blocks 310, 315, one for each of the data sections 322, 324 into which the received user data is divided. Furthermore, in a 'write' direction, each ECC block 310, 315 receives a single data section 322, 324 and outputs a single codeword section 312, 317 comprising the received data section 322, 324 and a corresponding error correction code. Furthermore, in a 'read' direction, each ECC block 310, 315 receives a single codeword section 312, 317 and outputs a corresponding data section 322, 324. Separate ECC blocks have been illustrated in order to facilitate the understanding of the illustrated example, and that a memory access module adapted in accordance with other example embodiments may not be limited to comprising such individual ECC blocks. For example, in a 'write' direction, such a memory access module may comprise one or more ECC blocks arranged to receive a plurality of data sections 322, 324, and to apply error correction codes to each of the received data sections 322, 324 and to output the resulting plurality of codeword sections 312, 317. Furthermore, in a 'read' direction, such ECC blocks may be arranged to receive a plurality of codeword sections 312, 317 and to output the corresponding data sections 322, 324.

Furthermore, for the illustrated example, the user data 320 in the 'write' direction is divided into data sections 322, 324 before being provided to the ECC blocks 310, 315. Similarly in the 'read' direction the data sections 322, 324 are output by the ECC blocks 322, 324 to be subsequently re-combined to recover the user data 320. However, the dividing of the user data into data sections and the re-combining of data sections to recover user data may alternatively be at least partly performed within one or more ECC blocks.

Furthermore, for the illustrated example, the memory access module 305 comprises substantially 'common' read and write paths; that is to say for the illustrated example data bits being read from the memory element 330 take substantially the same path during a read operation as they did during a previous write operation. However, the memory access module 305 may comprise at least partly separate read and write paths. For example, the memory access module 305 may comprise one or more 'read' ECC blocks arranged to receive data sections and apply error correction codes to the received data sections to form codeword sections, and one or more separate 'write' ECC blocks arranged to receive codeword sections and to perform error detection and correction thereon to retrieve data sections. In a still further example, separate memory access blocks may be implemented for read and write operations. For example, a first memory access block may be arranged to receive data to be written to memory, divide the received data into a plurality of data sections, apply error correction codes to the data sections to form codeword sections, interleave the codeword sections to form an interleaved data codeword, and write the interleaved data codeword to memory. Conversely, a second memory access block may be arranged to read a data codeword from memory, de-interleave the read data codeword to obtain a plurality of codeword sections, perform error detection and correction on the de-interleaved data codeword sections to retrieve data sections and combine the retrieved data sections to reproduce user data.

Figure 4:
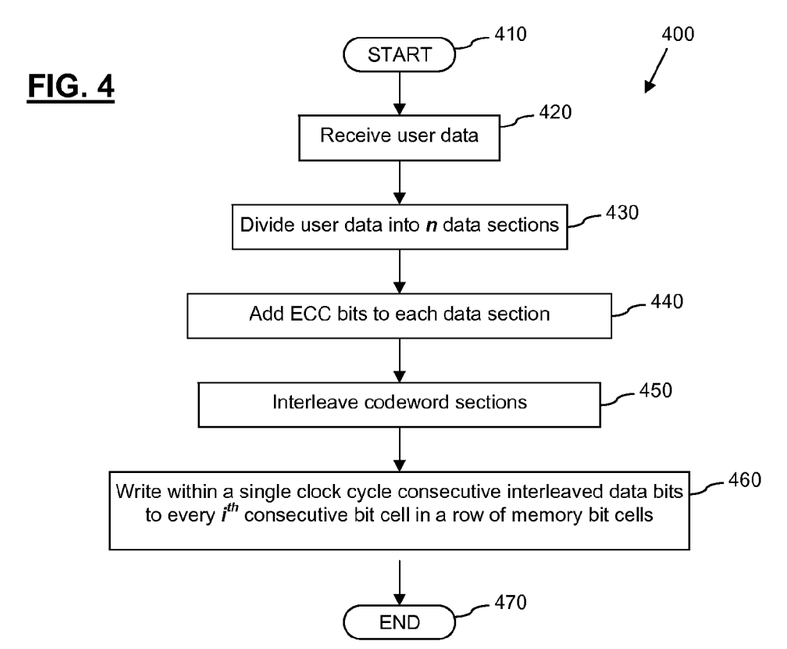
FIG. 4 illustrates a simplified flowchart of an example of a method for providing data protection for data stored within a memory element.

Referring now to FIG. 4 there is illustrated a simplified flowchart 400 of an example of a method for providing data protection for data stored within a memory element according to some example embodiments of the present invention. The method starts at step 410, and moves on to step 420 with a receipt of user data to be written to memory. Next, at step 430, the user data is divided into n data sections. Error correction code bits are then applied to each data section in step 440 to form codeword sections comprising, for the illustrated example, ECC extended data sections in step 440. The codeword sections are then interleaved at step 450 to form an interleaved data codeword, which is then written within a single clock cycle to every $i^{th}$ consecutive bit cell in a row of memory bit cells, for example by way of multiplexing or the like. The method then ends at step 470.

Figure 5:
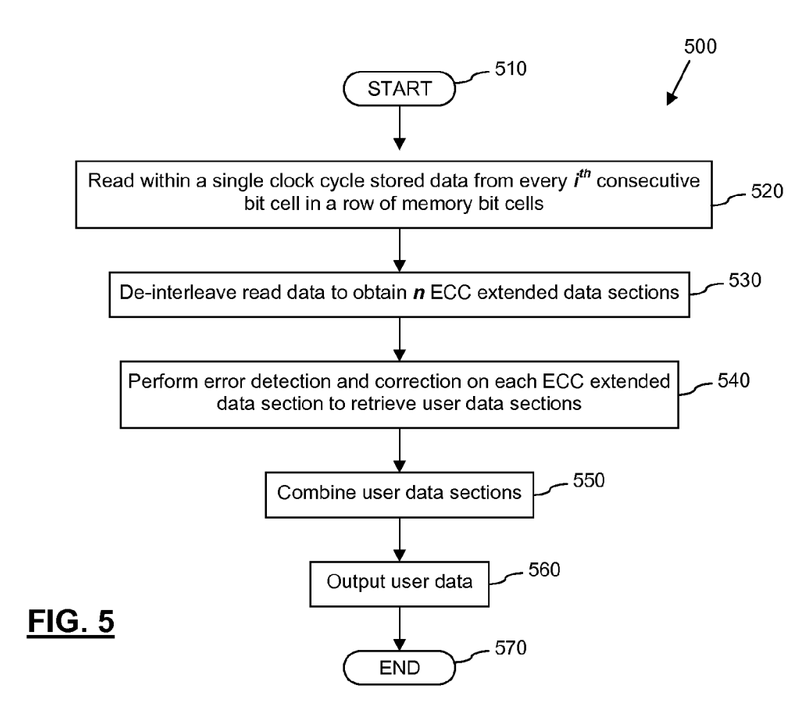
FIG. 5 a simplified flowchart of an alternative example of a method for providing data protection for data stored within a memory element.

Referring now to FIG. 5, there is illustrated a simplified flowchart 500 of a further example of a method for providing data protection for data stored within a memory element according to some example embodiments of the present invention. The method starts at step 510, and moves on to step 520 where stored data is read within a single clock cycle from every $i^{th}$ consecutive bit cell in a row of memory bit cells. Next, at step 530, the read data is de-interleaved to obtain n codeword sections comprising, for the illustrated example, ECC extended data sections. Error detection and correction is then performed on the codeword sections to retrieve user data sections in step 540, and the user data sections are then combined to reproduce the user data at step 550. The user data is then output at step 560, and the method ends at step 570.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, for the illustrated example described above, ECC blocks arranged to perform single-bit error correction techniques have been described for applying error correction codes to the data sections to form codeword sections. However, in other example embodiments multi-bit error correction techniques may alternatively be applied to data sections to form codeword sections.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. For example, the memory element 330 illustrated in FIG. 3, and the associated multiplexing circuitry of the memory access module 305 may be implemented within a first integrated circuit or device, whilst the remaining components of the memory access module 305 may be implemented on one or more further integrated circuits or devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for providing data protection for data stored within a Random Access Memory element, the method comprising:
   receiving data to be written to memory;
   dividing the received data into a plurality of n data sections, wherein each one of the n data sections comprises at least one data bit;
   applying an error correction code to each one of the n data sections to form a respective codeword section, wherein each codeword section comprises the at least one data bit and at least one Error Correction Code (ECC) bit appended to the at least one data bit;
   interleaving every data bit and every ECC bit of each codeword section with every data bit and every ECC bit of every other codeword section to form an interleaved data codeword, wherein consecutive bits of each codeword section are located at one in every n consecutive bits of the interleaved data codeword; and
   writing within a single clock cycle the interleaved data codeword to memory.

2. The method of claim 1 further comprising:
   multiplexing, prior to said writing, the interleaved data codeword, wherein consecutive bits of the interleaved data codeword are written within the single clock cycle to one in every i consecutive bit cells in a row of memory bit cells of the memory.

3. The method of claim 1 further comprising:
   multiplexing, prior to said writing, the interleaved data codeword, wherein consecutive bits of the interleaved data codeword are written within the single clock cycle to one in every four consecutive bit cells in a row of memory bit cells of the memory.

4. The method of claim 1 further comprising:
   applying a single-bit error correction code to each one of the n data sections to form the respective codeword section.

5. The method of claim 1 further comprising:
   dividing the received data into two data sections.

6. A method for providing data protection for data stored within a Random Access Memory element, the method comprising:
   reading, in a single clock cycle, a data codeword from a memory;
   de-interleaving the read data codeword to obtain a plurality of n codeword sections, wherein consecutive bits of each codeword section are obtained from one in every n consecutive bits of the read data codeword and each codeword section comprises at least one data bit and at least one Error Correction Code (ECC) bit appended to the at least one data bit;

performing error detection and correction on each one of the n codeword sections to retrieve a respective data section; and combining each one of the n retrieved respective data sections to reproduce user data.

7. The method of claim 6 further comprising:
de-multiplexing, prior to said de-interleaving, the read data codeword, wherein consecutive bits of the data codeword are from one in every i consecutive bit cells in a row of memory bit cells of the memory.

8. The method of claim 6 further comprising:
de-multiplexing, prior to said de-interleaving, the read data codeword, wherein consecutive bits of the data codeword are from one in every four consecutive bit cells in a row of memory bit cells of the memory.

9. The method of claim 6 further comprising:
performing single-bit error detection and correction on each one of the n de-interleaved codeword sections to retrieve the respective data section.

10. The method of claim 6 further comprising:
de-interleaving the read data codeword to obtain two codeword sections.

11. The method of claim 6 further comprising:
reading a 44 bit data codeword from the memory;
de-interleaving the 44 bit data codeword to obtain two 22 bit data codeword sections;
performing error detection and correction on the de-interleaved data codeword sections to retrieve two 16 bit data sections; and
combining the two 16 bit data sections to reproduce a 32 bit data word.

12. An integrated circuit device comprising a memory access module for writing received data to a Random Access Memory, wherein the memory access module comprises:
a plurality of n error correcting code blocks, each coupled to receive one of n sections of the received data, and configured to apply an error correction code to each one of the n received data sections to form a respective codeword section, wherein each one of the n data sections comprises at least one data bit, and the respective codeword section comprises the at least one data bit and at least one Error Correction Code (ECC) bit appended to the at least one data bit;
wherein the memo access module is configured to:
interleave every data bit and every ECC bit of each one of the respective code word sections with every data bit and every ECC bit of every other code word section to form an interleaved data codeword, wherein consecutive bits of each codeword section are located at one in every n consecutive bits of the interleaved data codeword; and
write in a single clock cycle the interleaved data codeword to the Random Access Memory.

13. The integrated circuit device of claim 12, further comprising a multiplexer, coupled to the plurality of n error correcting code blocks, configured to write consecutive bits of the interleaved data codeword to one in every i consecutive bit cells in a row of memory bit cells of the Random Access Memory.

14. The integrated circuit device of claim 12, further comprising a multiplexer, coupled to the plurality of n error correcting code blocks, configured to write consecutive bits of the interleaved data codeword to one in every four consecutive bit cells in a row of memory bit cells of the Random Access Memory.

15. The integrated circuit device of claim 12, further configured to apply a single-bit error correction code to each one of the n received data sections to form the respective codeword section.

16. The integrated circuit device of claim 12, further configured to divide the received data into two data sections.

17. The integrated circuit device of claim 12, further configured to:
read, in the single clock cycle, a data codeword from the Random Access Memory;
de-interleave the read data codeword to obtain the n codeword sections;
perform error detection and correction on each one of the n codeword sections to retrieve the respective data section; and
combine each one of the n retrieved respective data sections to reproduce user data.

18. The integrated circuit device of claim 17, further comprising a multiplexer configured to read consecutive bits of the data codeword from one in every i consecutive bit cells in a row of memory bit cells of the memory.

19. The integrated circuit device of claim 17, further comprising a multiplexer configured to read consecutive bits of the data codeword from one in every four consecutive bit cells in a row of memory bit cells of the memory.

20. The integrated circuit device of claim 17, further configured to perform single-bit error detection and correction on each one of the n codeword sections to retrieve the respective data section.

* * * * *